United States Patent
Slonim

[19]

[11] Patent Number: 6,145,715
[45] Date of Patent: Nov. 14, 2000

[54] BELT AND BICYCLE MOUNTABLE BEVERAGE HOLDER

[76] Inventor: Melissa Slonim, 10672 Passerine Way, San Diego, Calif. 92121

[21] Appl. No.: 09/197,954

[22] Filed: Nov. 20, 1998

Related U.S. Application Data

[63] Continuation-in-part of application No. 08/905,448, Aug. 4, 1997, abandoned.

[51] Int. Cl.⁷ .................................................. B65D 23/08
[52] U.S. Cl. .................................... 224/148.3; 224/148.4; 224/417; 224/421; 224/901.4; 224/926
[58] Field of Search ............................ 224/148.3, 148.4, 224/585, 926, 901.4, 580, 417, 421; D7/608, 620

[56] References Cited

U.S. PATENT DOCUMENTS

| | | | |
|---|---|---|---|
| 5,007,566 | 4/1991 | Fick | 224/414 |
| 5,048,734 | 9/1991 | Long | 224/148.4 X |
| 5,325,991 | 7/1994 | Williams | 224/901.4 |
| 5,848,734 | 12/1998 | Melk | 224/148.3 X |

*Primary Examiner*—Renee Luebke
*Attorney, Agent, or Firm*—Mark C. Jacobs, Esq.

[57] ABSTRACT

A washable cylindrical body, closed at the bottom and open at the top receptacle mountable on a bicycle, or tricycle which cylindrical body can be readily removed therefrom and either hand carried or secured upon a trouser's belt or pack strap, for transporting a fluid containing bottle or can. An optional insert securable within the container serves to retain the heat or cold of the fluid over a period of time. An optional zipper cover can also be added. An optional elastomeric star top can overlay the opening of the body and be used alone or in conjunction with a zipper cover.

21 Claims, 5 Drawing Sheets

BELT AND BICYCLE MOUNTABLE BEVERAGE HOLDER

RELATED APPLICATIONS

This application is a continuation in part of U.S. Ser. No. 08/905,448 filed Aug. 4, 1997, now abandoned.

BACKGROUND OF THE INVENTION

1. Field of Invention

This application pertains to a carrier for beverage bottles and cans which carrier can be bike mounted or belt mounted.

2. Known Prior Art

The following U.S. patents are known to applicant, none of which anticipate or render the instant invention obvious to one or ordinary skill in the art.

| APPLICANT | U.S. Pat. No. | ISSUE DATE |
| --- | --- | --- |
| STRICKLAND | 4,282,279 | August 4, 1989 |
| SATTERFIELD | 4,955,516 | September 11, 1990 |
| FICK | 5,007,566 | April 16, 1991 |
| LONG | 5,048,734 | September 17, 1991 |
| JONES | 5,216,900 | June 8, 1993 |

The Satterfield device, U.S. Pat. No. 4,955,516 is a portable beverage carrier with a zippered top closure on each of the two retainers. With only a clip and grip mounting, on the top frame tube, if only one bottle or can were to be carried, there appears to be a high probability of tilt or spillage even with the presence of the second hook and loop straps recited.

The Strickland device comprises an insulating layer that wraps around a beverage container. It has neither a top nor a bottom wall and is not attachable to anything.

The device of Long, U.S. Pat. No. 5,048,734, while it can be mounted to one's belt, it can not be mounted to a bicycle. The nature of the overlaying cover with a VELCRO® or equal closure is such that it is best opened if two hands are used, one to hold the cylinder and the other to pull up on the closure. It is believed that due to the construction employed, that as the weight of the container with the receiver, bears down on the belt, that the closure will have a tendency to open or become unattached.

The device of Fick, U.S. Pat. No. 5,007,566 mounts on the lower frame tube of a bicycle around the optional at extra cost existing cage that holds a water bottle on an angle. This product has neither a top wall or a bottom wall, and is intended solely as an insulation provider and not as a retainer. It's very placement is totally contrary to one of the stated purposes of the device of this invention.

The soft sided cooler of Jones, is not intended for direct belt mounting nor for mounting on a bicycle. It is intended for placement within a Fanny pack as noted in FIG. 1. Both Satterfield and Fick disclose the presence of temperature retaining elements.

Because cyclists like ready access to their beverage without having to remove their eyes from the road, and because most cyclists at times find it necessary to walk their bicycle or tricycle, and still desire easy access to their refreshment, or because the rider may park his or her cycle, and walk a bit or sit under a tree, a combination belt and bike beverage holder seemed to fit a need in the marketplace. Thus this invention came to be.

SUMMARY OF THE INVENTION

A receptacle mountable to the neck and top frame tube of a bicycle, or tricycle, and which can be removed therefrom and either hand carried or secured upon a belt, pack strap, or the like, for transporting a fluid containing bottle or can. An optional insert securable within the container serves to retain the heat or cold of the fluid over a period of time. The device is washable and non-breakable. An optional zipper cover or a retaining member can also be added.

It is an object of this invention to provide a bicycle mountable retainer for a water bottle and the like.

It is another object to provide a device to carry a fluid containing bottle on a bicycle while the bicycle is in use.

It is still another object to provide a bottle retainer that mounts on the bicycle or tricycle in front of the rider.

It is yet another object to provide a device which can be readily accessed by a rider in motion, without having to bend over or remove his/her eyes from the road.

It is an additional object to provide a device which can alternatively be removed from the bicycle and carried on one's belt.

It is a further object to provide a device suitable for the carrying of 12 ounce soda cans and water bottles.

It is another object to provide a portable container which can retain the temperature of a bottle of fluid as either cool or warm.

It is a further object to provide a container which while mountable to a bike or trike, can also be hand carried.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

DESCRIPTION OF THE PREFERRED EMBODIMENT

Figures 1, 2, 3A:
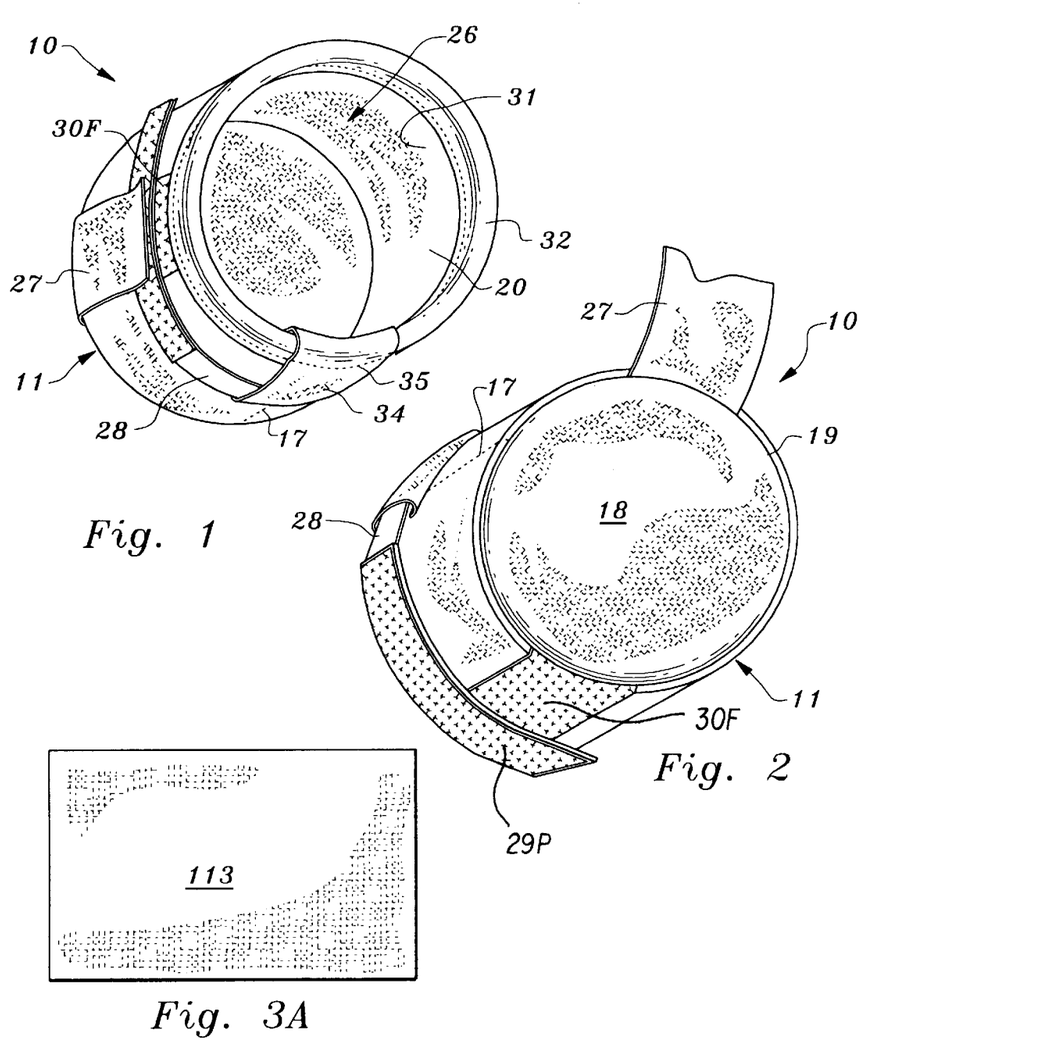
FIG. 1 is a top perspective view of the device of this invention without the optional temperature retainer therein.
FIG. 2 is a bottom perspective view of the device of this invention, with sections of it disengaged.
FIGS. 3A and 3B depict alternate plan views of the configuration of an internal portion of the device of this invention prior to assembly.
Figure 3B:
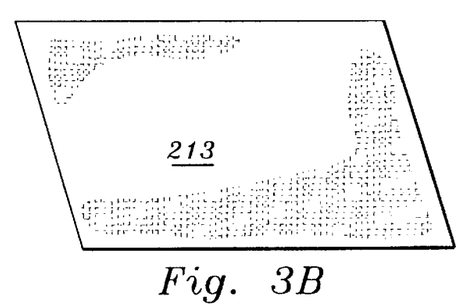
Figure 4:
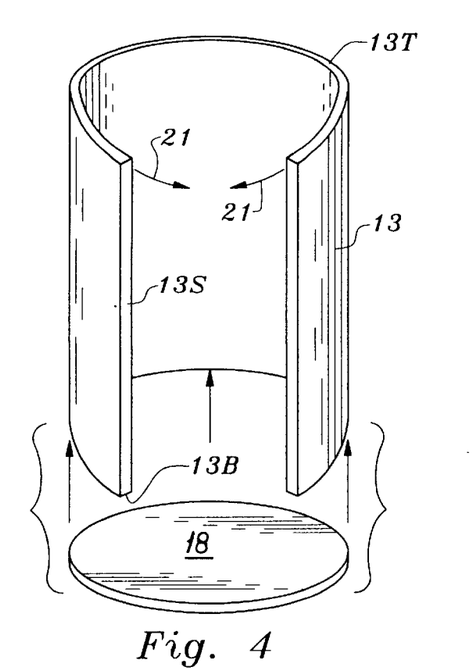
FIG. 4 is a perspective view at a point in time during the assembly of the device.

In FIGS. 1 and 2, the device of this invention is depicted fully assembled, while in FIGS. 3A, 3B and 4 it is shown during the course of assembly. Thus device 10 is seen to be a cylindrical member, closed off at one end. The body 11 has a sidewall 12—see FIG. 10—which is formed from main panel 13 and second panel 14, not seen in this figure, attached thereto, preferably by sewing one to the other, as will be discussed infra. Main panel 13, may be formed from a laminate of two layers; an outer layer 15, which is a vinyl backed polyester or a nylon fabric layer, laminated to an inner polyurethane foam sheet layer 16. Second panel 14 may be formed of the same two layers, 15 and 16. The last component of the sidewall 13 is the lining 31, more about which will be recited infra.

The body 11 is capped off at its bottom by a bottom wall 18 which is formed from the second panel 14 as discussed supra. The lining 31 is preferably not attached to the bottom wall 18.

Main panel 13 can shaped as a rectangle, 113 per FIG. 3A or a parallelogram 213 per FIG. 3B, with the parallelogram configuration being preferred due to the strength that is obtained by sewing on the bias, rather than in sewing in the direction of movement of the contents (water bottle etcetera) which is a vertical access and egress.

Figure 10:
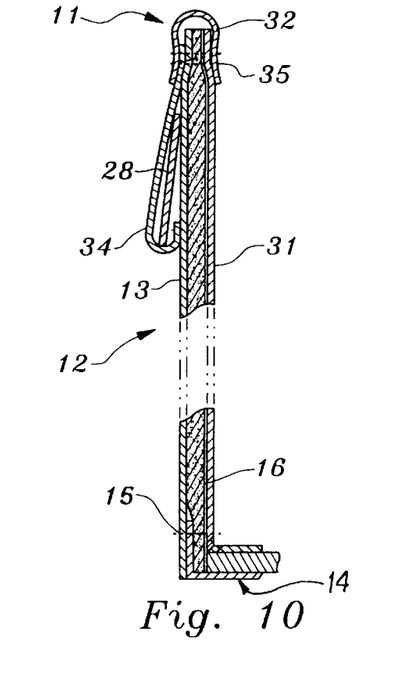
FIG. 10 is a sectional partial view of the body of this invention.

The diagrammatic view of FIG. 4 shows the main panel 13, and the second panel 14, each of which is formed by a lamination of two layers per previous discussion, during the course of assembly as by the conventional sewing of one panel to the other. For the purposes of assembly it matters not which configuration 13A or 13B is employed for the main panel. The sidewall 12, per FIG. 10 is also seen to include a top lip 32 formed preferably from nylon bias tape and sewed in place along stitch line 35 at the upper edge of the main panel 12.

Device 10 also includes a belt loop 40 and a trio of VELCRO® or other brand of hook and pile containing bands. The longest band 27 is a vertically disposed band which may be formed in part from a nylon webbing section 27A to impart strength, to which is attached an elasticized nylon section 27B. Section 27B terminates on its interior face in a hook portion, 27C of hook and pile closure. Section 27A per FIG. 6, runs the full length of the sidewall to impart support and strength to the sidewall. The proximal end of section 27B is secured as by sewing or other means at about ⅓rd of the elevation up from the bottom of the sidewall, overlying section 27A. The balance of section 27 dangles from the body for ultimate attachment as will be discussed supra.

Figure 6:
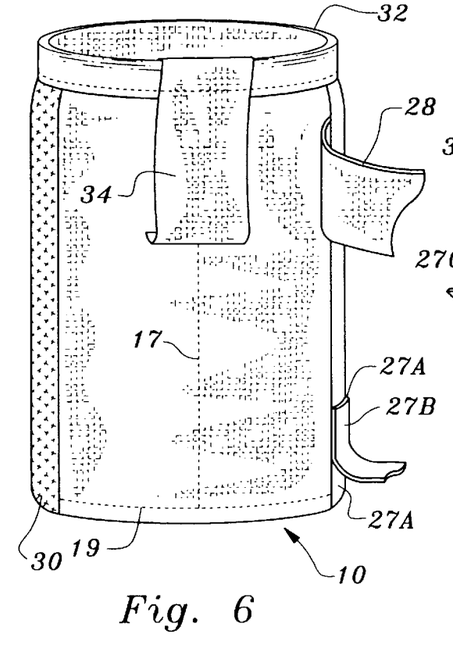
FIG. 6 is a rear perspective view of the device with certain sections disengaged.

Also seen in FIG. 6, is the hem or junction 17, of the sewing of two ends of the main panel to each other to form the cylinder being formed in FIG. 4. The bottom stitching 19 constituting the junction of the bottom or second panel to the main panel is seen in both FIGS. 6 and 2.

The second band 28, is a horizontal one, preferably formed of elasticized nylon. This may be sewn or otherwise attached in place, at its proximal end, spaced down from the open top of the device 20, as best seen in FIG. 1. Attachment may be either over or underneath the first band 27, a short distance horizontally along the length of band 28. The balance of band 28 is unattached to the main panel. At the distal end of the main panel, a pile segment of VELCRO® or other similar fastener, 29P is sewn to the exterior surface of band 28. An equally sized hook segment, 29H, is attached on the opposite or interior surface of the distal end of band 28.

Figure 7:
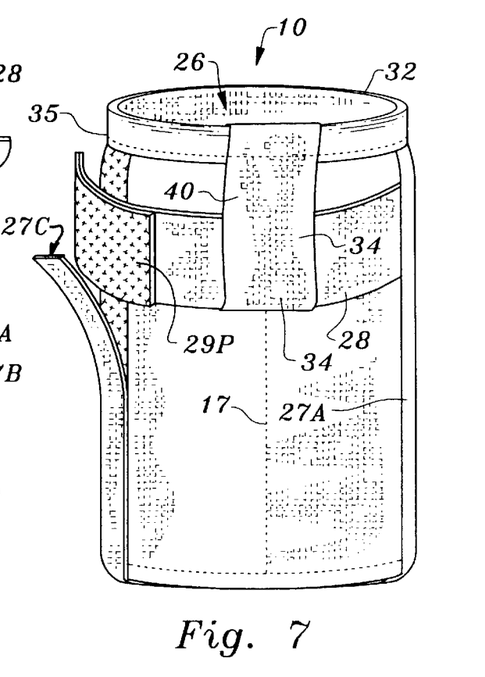
FIG. 7 is a view similar to that of FIG. 6, but with some of the sections engaged and one section in the process of engagement.
Figure 8:
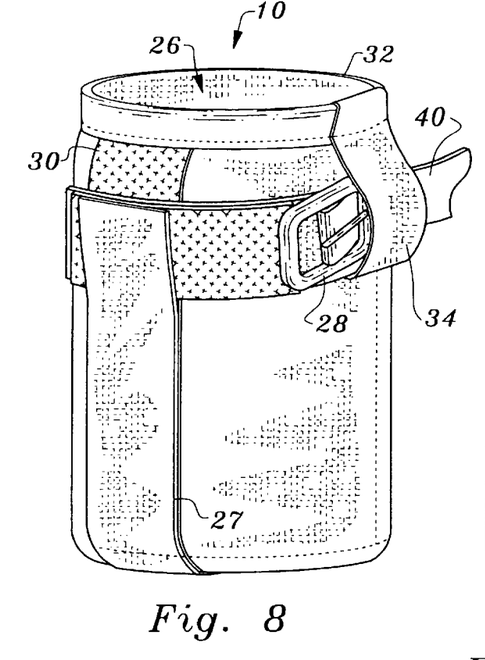
FIG. 8 is a side perspective view of a unit of this invention in the process of being mounted on a belt.

The belt loop 34, seen in FIGS. 1, 2, 7, and 8 is a length of nylon or other webbing approximately 1 inch to 1.5 inches wide, in a generally vertical orientation, spaced from the first band 27 and parallel thereto. While shown in the drawing as being to the left of band 27, the belt loop could also be located to the right of the first band 27. The belt loop 34 is first attached at its lower end, to the main panel, preferably horizontally across the seam or side hem 17, per FIG. 6. These stitches or other attachment are not seen in the drawings, as the webbing section is then bent upwardly to form the loop. Belt loop 34 is attached at both ends but is left unattached along the length thereof. For extra strength, the belt loop 34, may be slightly elongated at its upper end, to overlap the bias tape 32 per FIGS. 1 and 10 and attached to both sides of the bias tape 32 as by stitches 35, per FIGS. 1 and 6. Alternatively the upper end of the loop may be attached directly to the main panel 13. In FIG. 8, a belt and buckle 40 are seen in the process of engaging the belt loop 34. The term belt as used herein also includes a fanny pack or other pack strap.

Figure 9:
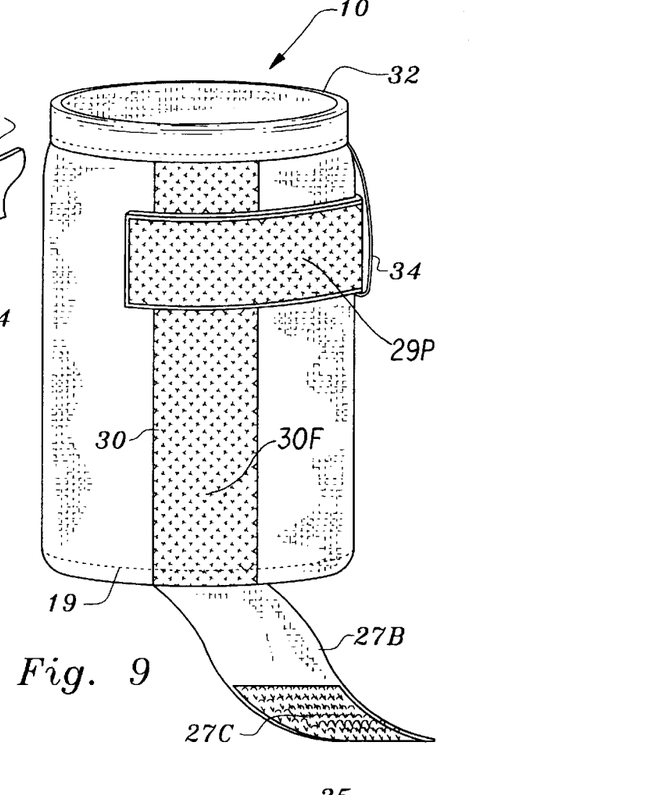
FIG. 9 is a perspective view of an assembled unit of the product of this invention with the bands partially engaged.

The third band 30, is a vertical band and is seen best in FIGS. 6, 8 and 9, and is spaced approximately 180 degrees from the first band 27 around the circumference of the main panel. It is of approximately the same width as band 27. This band 30 is attached along its entire length to the main panel 13, and it has a face of pile 30F, (FIG. 1) to serve as an engaging mechanism in a hook and pile closure.

When the pile face 30F is in an engaged relationship, it will receive the interior face of the second band, 29H, as well as a part of the hook segment on band 27, the balance of the hook segment attaching itself to 29P, the exterior surface of the distal end of horizontal band 28. See FIGS. 7, 8, and 11. Thus the second band when engaged is seen to extend approximately 180 to 190 degrees around the circumference of the main panel 13.

The discussion now turns to FIG. 4. Here main panel 13 is seen to be a quadrilateral member having top and bottom edges 13T, 13B and sidewalls 13S, of a lesser dimension than the top and bottom walls. Main panel 13 may be either a rectangle per FIG. 3, designated 113 or a parallelogram 213 as shown in FIG. 3B, both of which are quadrilaterals. The main panel 13, when stitched together per the arrows forms a cylinder. The hem of such stitching is shown in FIG. 6 as stitch line 17. The main panel may be formed from readily available neoprene sheet such as used in the manufacture of skin diving suits. The main panel may also be formed of vinyl backed polyester, also a readily available material, but of lower cost as well as Cordura™ nylon. Second panel 14, the base is made of the same materials, and is of a circular configuration.

Secondary panel 14, and the main panel 13, may also comprise a sheet of nylon webbing or other materials which possess similar weather resistance and scuff resistance as those just mentioned.

ASSEMBLY

The discussion below starts with the formation of the main body tubular member and the addition of the base, with the subsequent attachment of the bands discussed above. For ease of manufacturing, however, it may well be that attachment of the various band to main panel 13 is easier and more cheaply accomplished prior to the formation of the cylinder along hem line 17, than afterwards. Of course, the type of sewing machine available to accomplish these ends will influence the steps of the procedure of assembly.

The assembly of device 10 commences with the attachment of the secondary panel 14 to the main panel 13, either pre or post the formation of hem 17 using conventional sewing techniques. The bottom hem 19, after such stitching is seen in FIG. 2.

Once the two panels are sewn or otherwise attached, with mention being made of such alternate attachment means as gluing, or perhaps some other conventional means such as heat sealing, depending upon the materials employed, there is now formed an open at one end tubular unit.

Reference is now made to FIG. 10, which is a partial diagrammatic sectional view of a unit of this invention. The purpose of this view is to illustrate that the main panel 13 is formed of two layers an outer layer such as the vinyl backed polyester, 15 and an inner layer of urethane or other foam or flexible sheet material for strength and configuration integrity. The optional added lining 31 is shown adjacent the inner layer. The lining may be of any water resistant fabric. Lining 31 is sewn or otherwise attached at the upper edge of the main panel, preferably beneath the bias tape. It can also be secured, if desired, to the second panel 14. In addition, the lining may be pre-attached as by gluing to the interior face of the foam. It is also within the scope of the invention to use a combination main panel wherein the outer and inner layer are formed of a preexisting laminate of dissimilar materials to serve the same purposes.

FIG. 10 also shows the attachment of the lip of such material as folded bias tape 32, to both the inner and outer layers and the lining 31. This is accomplished by conventional stitching.

Once the body 11 is formed, belt loop 34 is sewn or otherwise attached in the manner previously discussed. The belt loop 34, is employed to permit the device 10 to be carried on one's belt, during periods of non-use on a bicycle such as while walking.

Disposed in a circumnavigating manner around the body 11 are a pair of bands, 27 and 28 as per FIG. 6, 7, 8, and 11. Portions of these two bands have hook and pile closure or fastener segments thereon. The most famous brand of such fasteners are those sold under the VELCRO® brand name. It is known that such fasteners comprise two engageable strips. One of the strips contains the "pile" in relatively stiff fibers resembling a carpet. The other strip includes the "hook" elements comprising a large plurality of hook-shaped fibers. These strips mate together firmly, but not inseparably upon being pressed together. Disengagement is carried out by a hand "peeling" force. Reference is made to U.S. Pat. No. 4,047,250.

While a single belt loop 34 attached at the top along stitch line 35 is depicted in the drawing, more than one could also be utilized, in a spaced-apart relationship.

FIGS. 1 and 2 and, more particularly, 6 thru 9 inclusive depict the engagement of the several bands discussed infra to form an assembled unit. Of course it is recognized per reference to FIG. 8, that engagement of the various bands is for cosmetic purposes only if the unit 10 is to be carried on one's belt.

Thus as seen in FIG. 6, band 28 is preferably placed through the belt loop 34, though band 28 could also be placed over the belt loop, if the device is to be hand carried or bike mounted. After placement through the belt loop, engagement of segment 29H, the hook aspect of the fastener, with the third band 30, a pile segment is made. See also FIGS. 12 and 13, wherein the unit is being mounted to the bike 80's stem 81.

Band 27 is moved from its draping sideward disposition in FIG. 6 to a position beneath the base or secondary panel 14 in FIG. 7 for engagement of 27C, also a hook section to at least one of, band 28's pile segment 29P, as well as to the pile third band 30. This ability will be influenced by the diameter of the top tube, 82 often referred to as a crossbar, 82. See FIGS. 8 and 14 specifically.

Figures 12, 13, 14, 15:
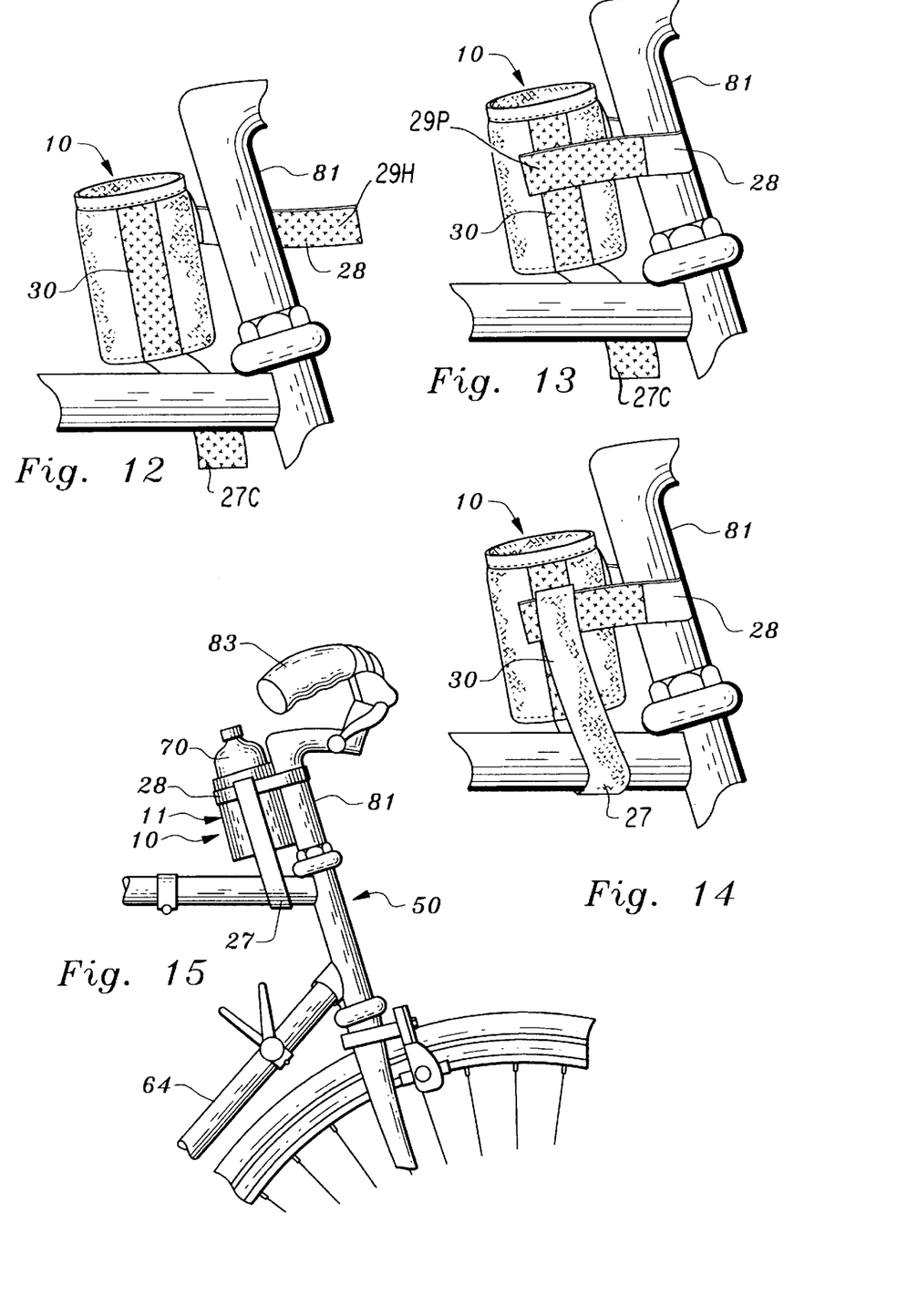
FIGS. 12, 13, and 14 are close-up diagrammatic views showing the steps involved in mounting this device to the neck and the frame top tube of a cycle.
FIG. 15 is a diagrammatic view showing a unit of this invention, assembled and mounted in position on a typical bicycle.

FIG. 15 specifically illustrates the mounted location of the device 10 of this invention relative to the handlebars 83 and the top tube 82 and stem 81 of a bike, 80. Prior art bottle carriers of all types normally have been mounted on the down tube 84, a location that requires the user to take his or her eyes off the road ahead to access the bottle or can being retained.

Figure 5:
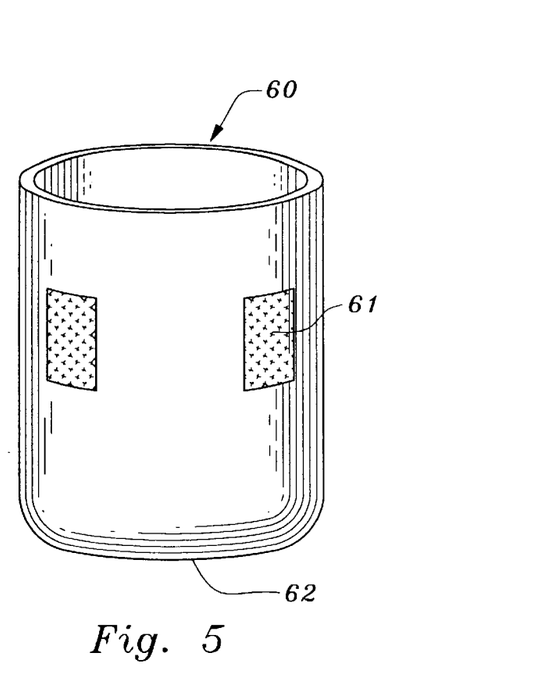
FIG. 5 is a perspective view of an optional molded temperature retaining insert forming part of this invention.

In FIG. 5, there is seen a flexible insert 60 that is used to retain the temperature of the beverage within the bottle or can to be disposed in device 10. Insert 60 comprises a flexible pouch having a temperature retaining material therein. The pouch can be frozen or heated in warm water to either release heat or absorb heat as may be desired while remaining flexible. Preferably at least one VELCRO® hook member tab strip or segment 61, is adhesed to the pouch 60 for engagement by a hook portion tab attached to but not seen here but shown in FIG. 11, on the lining of the device's body 11 for retention of the insert within the body when the water bottle 70, seen in FIG. 15 is withdrawn. Flexible packs which can be so utilized are made by Midlands Chemical Co, Inc. of Omaha Nebr.

In use it has been found that the temperature retaining inserts 60, will retain the temperature of the warm or cold beverage product; the exact duration depending upon the delta between product temperature and ambient temperature. While pouch 60 is shown having a bottom wall, 62, it is within the scope of this invention to omit such bottom wall as well.

Figure 16:
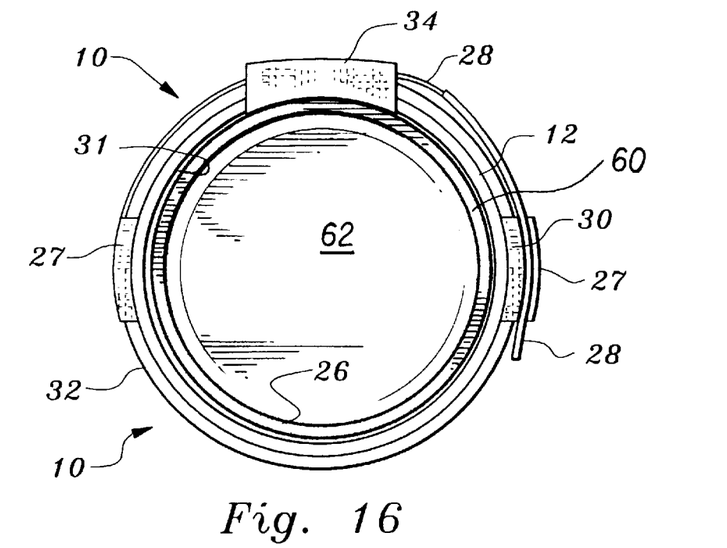
FIG. 16 is a top plan view showing the temperature insert disposed within the device of this invention.

Reference is made to FIG. 16 which shows an insert 60 disposed within device 10, though the second band is not visible in this view. The opening 26 of the interior 64 is seen to be empty.

Figure 11:
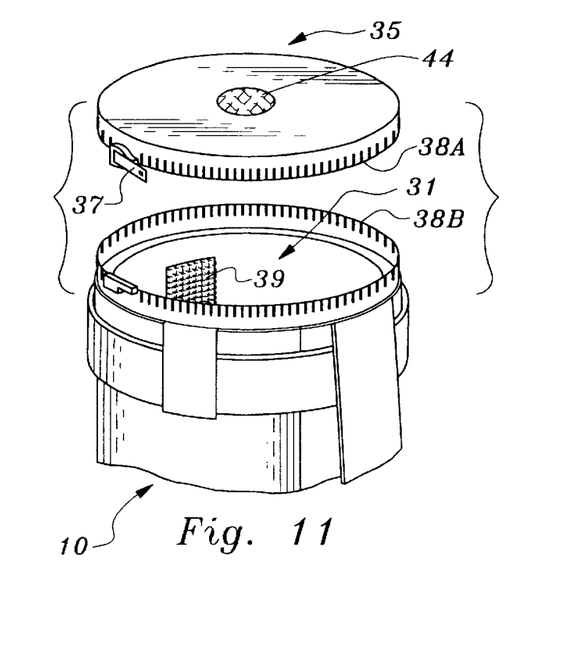
FIG. 11 is a perspective view of an assembled variant of the invention.

It is also within the scope of the invention to provide a removable cover such as seen in FIG. 11 and to optionally modify the interior diameter from about 2.75–3.5 inches, the diameter used to accommodate soda cans and bottles of water, to about 2–2.5 inches to accommodate jars of baby food or pudding or other snacks for the rider or a child. The elevation of the device may be designated to more easily accommodate a 12 ounce can of soda, for easy access if such is desired at about 4.5 inches, or to better accommodate a water bottle, which tends to be higher in elevation. To inhibit the possibility that the bottle tips out of the device, for example, an elevation of about 6 inches is suggested.

Thus in FIG. 11, wherein like numbers refer to like parts, device 10 is seen to also include a ½ set of zipper teeth 38B around the periphery of the opening 26, preferably upon the lip 32; or in place of the lip at the top edge of the main panel. A cover 36 having a matching and opposed ½ set of zipper teeth 38A and a zipper pull tab 37 is disposed around the periphery of cover, 36. This permits the device 10 to be used for double duty, i.e., retain solid items of a non-circular cross section as well as liquid bottles or cans as previously discussed at length. A VELCRO® tab 44 is adhesively disposed upon the cover 36, to permit the cover to be carried by the device when it is not zipped into place atop the device 10 by engaging tab 44, a hook segment with available pile segment not engaged. Note also the presence of tab 39 on the lining 31 to engage an insert 60 as may be desired.

While the cover depicted is engaged by a zipper to the body of the device, it is also within the scope of the invention to have the cap detachably secured to the body by a slide lock as is often employed on plastic folio bags as given to convention attendees.

Figure 17:
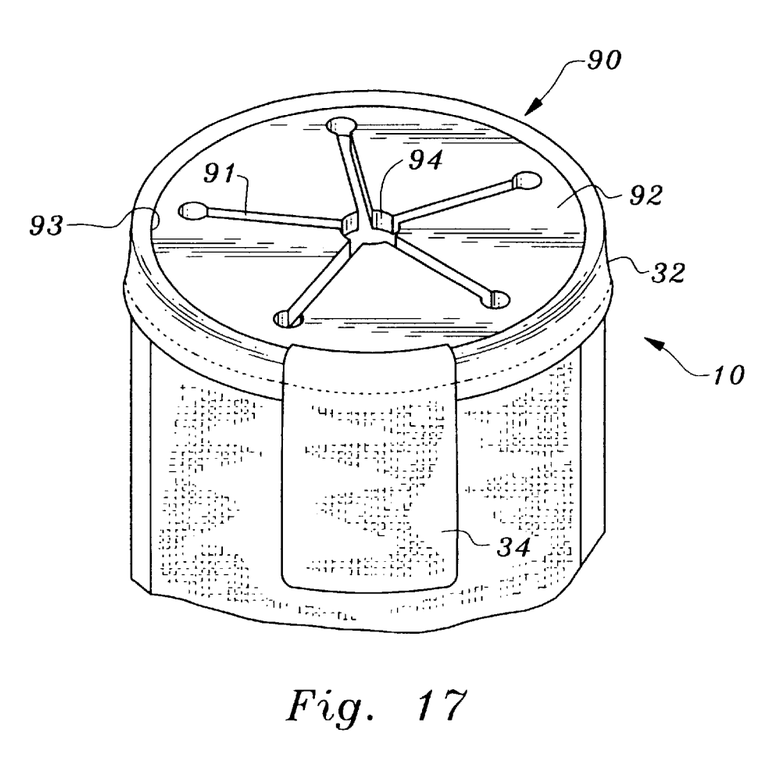
FIG. 17 is a partial perspective view of an assembled second variant of the product of this invention.

Previously it has been stated that the elevation as well as the diameter can be varied to suit particular beverage holders, be they cans or bottles, or other snacks. An additional variant is shown in FIG. 17, wherein a star top 90 is employed. Such a star top 90 has a plurality of adjacent pie shape segments 92 separated from the adjacent segment by a slot 91 and a central opening 94. The star top 90 includes a lip 93 which can be stitched or glued to the lip 32, per cutaway of this figure. The star top 90 resembles the trap used in household garbage disposers and would be made of flexible rubber. Here the top 90 permits containers of various diameters to be inserted, yet held snugly in place within its confines.

It is within the skill of the art to utilize any suitable material for the main panel. Thus mention may be also made of Cordura™ nylon, and canvas in addition to the neoprene and vinyl backed polyester previously mentioned.

MOUNTING OF THE DEVICE

The device of this invention is easy to use on both bike and belt. For bicycle mounting, one merely peels away the several VELCRO® or other hook and pile fastener bands, and wraps each respective one around the stem and crossbar as previously discussed, and re-engages it to secure the device in place directly in front of the rider for easy and immediate access. If a rider, while pedaling, chooses to use a straw, the bottle or can of refreshment need not even be removed from the device 10 for access to the fluid. Such is impossible with prior art beverage carriers. Belt mounting has been discussed previously with relation to FIG. 7.

The device of this invention may also be hand carried, by grasping the entire device or using the belt loop 34 as a handle.

USE OF DEVICE

The device of this invention should be sized in interior diameter to provide a releaseable semi-snug fit between the bottle or other container, and the interior of the body of the device. Since most individual user bottled water bottles and aluminum cans of soda or beer are almost about the same in cross section, the same device unit can be used for interchangeable temporary storage of either type of container. In addition, since the body is purposely constructed of a slightly stretchable material, the body can be expanded the minimal amount to accommodate the thickness of both the insert and the fluid receptacle within the confines of the opening 26 of the device.

When one wants a drink from a bike mounted unit, one merely leans over and sips out of an extra long straw or removes the bottle from the device and drinks directly therefrom, and quickly returns the container to the device, without taking his or her eyes off the road. There is no need to look down to one's bicycle frame to find and then release a water bottle from a clamping system as is now generally required. For example the star top may be in fact of a star-like configuration or any other member of a suitable configuration for the intended purpose of container retention may be employed.

It is seen that I have provided a multifunction carrier for both liquid and solid foodstuffs which can be hand held, bicycle mounted and belt carried which is lightweight and basically nonbreakable.

The size of the device may vary from about 4 inches to about 6 inches in elevation and from about 2.50 inches to 3.50 inches in diameter. Larger sizes to accommodate half liter and larger water bottles are within the scope of the invention however.

Since certain changes may be made in the above device without departing from the scope of the invention herein involved, it is intended that all matter contained in the above description, shall be interpreted as illustrative and not in a limiting sense.

I claim:

1. A lightweight flexible receptacle device for bottled water bottles and individual beverage cans and bottles, which receptacle is both adapted to be mounted to a bicycle's crossbar and stem, and to be belt carried, which device comprises:

a. a body having a sidewall comprising a cylindrical member of a finite elevation, which body is closed off at the first end by a bottom wall, and is open at a second end;

said body having a belt loop, which belt loop has a top edge and a bottom edge, secured along said edges to said sidewall of the device, such that an opening is defined for receipt of a belt horizontally therethrough;

b. at least three bands containing hook and pile closure segments, the first of which is secured at a first location vertically along the side of the body of said device and which band is of greater extension than the elevation of said body, such that an extension section depends from said body, said first band's extension section terminating in a hook portion of a hook and pile closure, c. a second band, horizontally disposed, having distal and proximal ends, the proximal end of which is attached spaced down on on the body, to said first band, the remainder of the band being unattached, at least the distal end of said second band having an interior surface and an exterior surface, the interior surface having a hook portion, of a hook and pile closure and the exterior surface has a pile portion thereon;

d. a third band, spaced from said first band around the circumference of said body, said third band comprising a pile portion of hook and pile closure, and secured vertically along the elevation of said body, whereby mounting to a bicycle, having a stem and crossbar and a neck is achieved by placing the device behind the stem and on top of the crossbar of the bicycle, wrapping said second band around the neck and engaging the hook portion of a hook and pile closure of said second band to said third band, and by wrapping the first band under the crossbar and releasably engaging its hook portion of a hook and pile closure to at least one pile portion.

2. The device of claim 1 wherein the cylindrical member is formed of a laminate of a member selected from a group consisting of vinyl backed polyester and neoprene laminated to a layer of urethane foam.

3. The device of claim 2 wherein a portion of the first band attached to the body of the device is made of webbing material.

4. The device of claim 1 further including a means to removably mount a temperature retaining insert to be disposed therein.

5. The device of claim 4 wherein the means to removably mount the insert comprises at least one hook and pile closure tab secured to the interior of the body of the device.

6. The device of claim 1 further including a detachable cover.

7. The device of claim 1 wherein the elevation ranges between 4.50 inches and 6 inches and the diameter ranges from between 2 inches to 3.50 inches.

8. In the device of claim 1 wherein portions of the first and second bands that are not closure sections, are formed of nylon webbing.

9. In the device of claim 1 wherein the body includes a fabric top lip sewn to the sidewall.

10. A lightweight flexible receptacle device for bottled water bottles and individual beverage cans and bottles, adapted to be mounted to a bicycle and to be belt carried which comprises:
  a. a flexible cylindrical body closed off at a first end by a bottom wall and open at the second end and having a belt loop having top and bottom edges, secured along said edges only, to the body of the device, such that an opening is defined for receipt of a belt horizontally therethrough;
  b. at least one horizontally disposed band, mounted at one end to said body and spaced from said belt loop, and having hook and pile closure sections on opposite sides of the other end thereof for mounting the device to a bicycle's stem by releaseably engaging with;
  c. another band spaced about 180 degrees from the mounting of said first mentioned band, and vertically disposed along the body of said device, said another band having a pile section of a hook and pile closure thereon.

11. In the device of claim 10 including a flexible elastomeric star top having a periphery overlying the open top of the device.

12. In the device of claim 11 further including, a zipper, one set of teeth of which are disposed around the periphery of the star top over the opening at the top of the device, and a cover comprising a cap having an opposed opposite set of zipper teeth and a pull tab disposed around the edge of the cap, whereby said cover can be zippered to the body of the device to effect closure.

13. The device of claim 12 further including a fabric lip attached to the top of the body around the opening.

14. A lightweight flexible receptacle device for bottled water bottles and individual beverage cans and bottles, adapted to be mounted to both a bicycle and to one's belt which device comprises:
  a. a cylindrical body closed off at a first end by a bottom wall, and is open at a second end, and having a lining attached around the interior periphery of the top of the device; a belt loop having top and bottom edges, sewn along its top and bottom edges only to the body of the device, such that an opening is defined for receipt of a belt horizontally therethrough;
  said body also having three bands containing hook and pile closure segments, the first of which is secured at a first location vertically along the side of the body of said device and which band has an extension section which depends from said body, said first band's extension section terminating in a hook portion of a hook and pile closure,
  c. a second band, horizontally disposed, having distal and proximal ends, the proximal end of which is attached spaced down on of the body, the balance of the band being unattached, at least the distal end of said second band having an interior surface and an exterior surface, the interior surface having a hook portion, of a hook and pile closure;
  d. a third band, spaced from said first band around the circumference of said body, said third band comprising a pile portion of hook and pile closure, and secured vertically along the elevation of said body,
whereby mounting to a bicycle is achieved by placing the device behind the stem and on top of the crossbar of the bicycle, wrapping said second band around the neck and engaging the hook portion of closure to said third band, and by wrapping the first band under the crossbar and releasably engaging its hook portion of closure to a pile portion of closure.

15. In the device of claim 14, wherein the exterior surface of the distal end of the second band has a pile portion of a hook and pile closure thereon whereby said first band can engage at least one and up to two pile portions of hook and pile closure.

16. The device of claim 15 further including a removably mounted temperature retaining insert disposed therein, and wherein the body of said device is comprised of vinyl backed polyester.

17. The device of claim 14 including:
  d. a fabric formed top lip sewn around the periphery of the opening of the device.

18. The device of claim 17 further including
  e. a zipper, one set of teeth of which are disposed around the periphery of the opening at the top of the device,
  f. a cover comprising a cap having an opposed opposite set of zipper teeth and a pull tab disposed around the edge of the cap, whereby said cover can be zippered to the body of the device to effect closure.

19. The device of claim 17, further including a flexible elastomeric star top overlying the opening of the cylindrical body, and attached to the lip thereof, said star top having a plurality of adjacent pie shaped segments, each of which is separated at least in part from its adjacent segments.

20. A lightweight flexible receptacle device for bottled water bottles and individual beverage cans and bottles, which receptacle is adapted to be mounted to a bicycle's stem and crossbar, which device comprises:
  a. a body having a sidewall comprising a cylindrical member, which body is closed off at a first end by a bottom wall, and is open at a second end;
  b. at least three bands containing hook and pile closure segments, the first of which is secured at a first location vertically along the side of the body of said device and which band has an extension section depending from said body, said first band's extension section terminating in a hook portion of a hook and pile closure,
  c. a second band, horizontally disposed, having distal and proximal ends, the proximal end of which is attached spaced down on the body, to said first band, the balance of the band being unattached, at least the distal end of said second band having an interior surface and an exterior surface, the interior surface having a hook portion, of a hook and pile closure;
  d. a third band, spaced from said first band around the circumference of said body, said third band comprising a pile portion of hook and pile closure, and secured vertically along the elevation of said body,
whereby mounting to a bicycle is achieved by placing the device behind the stem and on top of the crossbar of the bicycle, wrapping said second band around the neck and engaging the hook portion of closure to said third band, and by wrapping the first band under the crossbar and releasably engaging its hook portion of closure to a pile portion of closure.

21. In the device of claim 20 wherein the distal end of the second band has a pile portion of a hook and pile closure on the exterior surface thereof.

* * * * *